United States Patent
Miyazaki

(10) Patent No.: US 9,628,138 B2
(45) Date of Patent: Apr. 18, 2017

(54) MOBILE TERMINAL

(71) Applicant: KYOCERA Corporation, Kyoto-shi, Kyoto (JP)

(72) Inventor: Hironori Miyazaki, Osaka (JP)

(73) Assignee: KYOCERA CORPORATION, Kyoto (JP)

(*) Notice: Subject to any disclaimer, the term of this patent is extended or adjusted under 35 U.S.C. 154(b) by 0 days.

(21) Appl. No.: 14/980,399

(22) Filed: Dec. 28, 2015

(65) Prior Publication Data
US 2016/0191108 A1    Jun. 30, 2016

(30) Foreign Application Priority Data
Dec. 25, 2014    (JP) .................. 2014-263493

(51) Int. Cl.
*H04B 1/44*    (2006.01)
*H04B 1/54*    (2006.01)
*H04B 1/3827*    (2015.01)

(52) U.S. Cl.
CPC ............ *H04B 1/54* (2013.01); *H04B 1/3833* (2013.01)

(58) Field of Classification Search
USPC ........ 455/78, 550.1, 552.1, 448, 63.1, 67.11, 455/67.13
See application file for complete search history.

(56) References Cited

U.S. PATENT DOCUMENTS

| | | | |
|---|---|---|---|
| 8,000,737 B2* | 8/2011 | Caimi | H01Q 1/243 455/103 |
| 8,774,067 B2* | 7/2014 | Rousu | H01Q 1/242 333/126 |
| 2010/0022197 A1* | 1/2010 | Kato | H04B 1/3805 455/75 |
| 2010/0285836 A1* | 11/2010 | Horihata | H01Q 1/243 455/552.1 |
| 2011/0116423 A1* | 5/2011 | Rousu | H01Q 1/242 370/297 |

FOREIGN PATENT DOCUMENTS

JP    2014-042123 A    3/2014

* cited by examiner

*Primary Examiner* — Fayyaz Alam
(74) *Attorney, Agent, or Firm* — Procopio Cory Hargreaves and Savitch LLP

(57) ABSTRACT

A processor is configured to control a first communication module and a second communication module by executing a control program stored in a memory module such that communication at a first frequency included in a first frequency band or a second frequency included in a second frequency band is carried out using the first communication module, and such that communication at a third frequency included in a third frequency band is carried out using the second communication module. The first communication module includes an adjustment module. The adjustment module is configured to reduce interference between the first antenna and the second antenna when the communication at the third frequency is carried out.

8 Claims, 11 Drawing Sheets

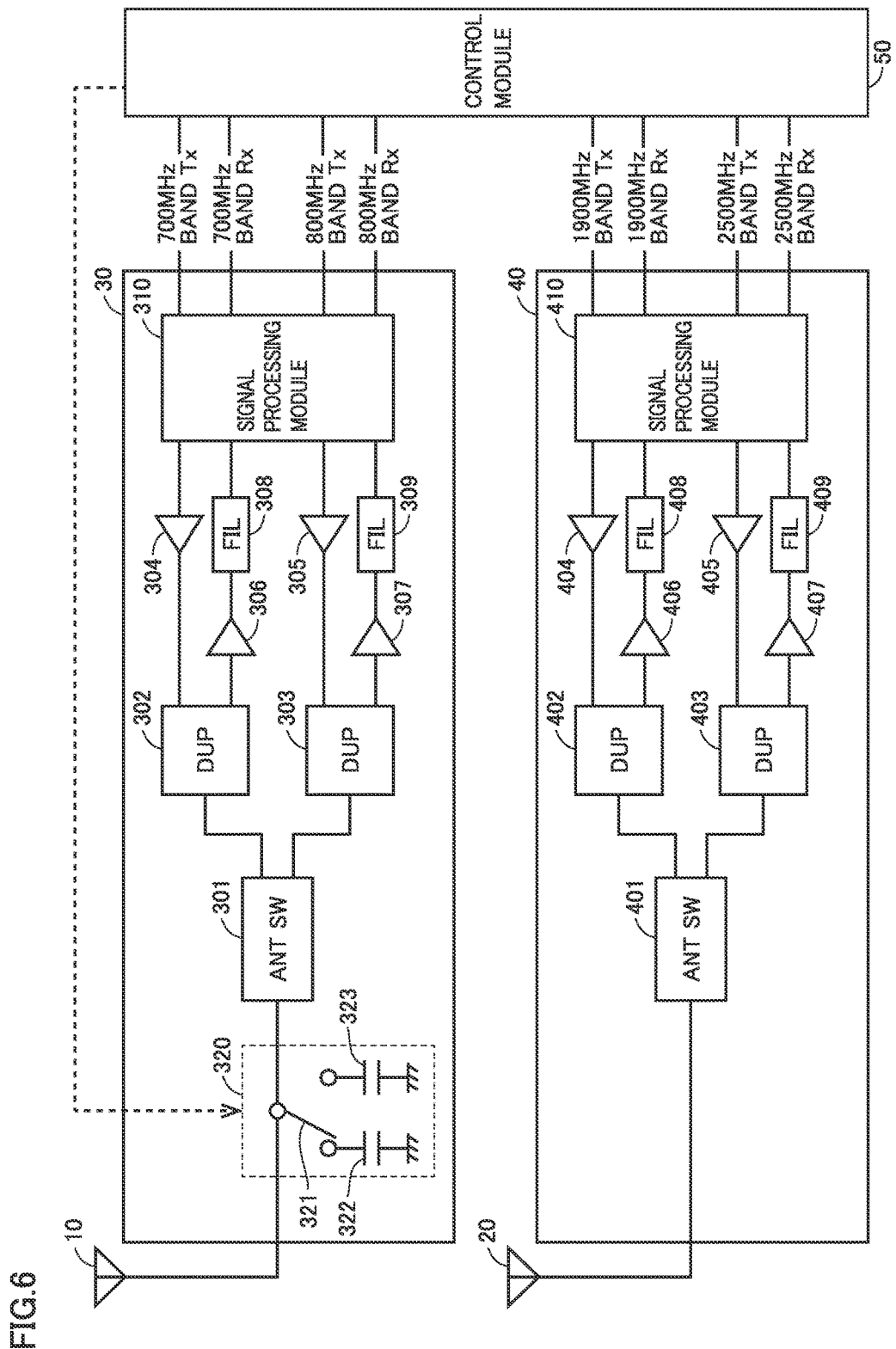

MOBILE TERMINAL

CROSS-REFERENCE TO RELATED APPLICATION

The present application claims priority under 35 U.S.C. §119 to Japanese Patent Application No. 2014-263493, filed on Dec. 25, 2014, entitled "Mobile Terminal". The content of which is incorporated by reference herein in its entirety.

FIELD

The present disclosure relates to a mobile terminal, and particularly to a multiband-compatible mobile terminal.

BACKGROUND

In recent years, mobile terminals are capable of carrying out communication in a broader frequency band, and there is a demand for multiband-compatible mobile terminals capable of carrying out communication in a plurality of frequency bands. There are known mobile terminals provided with an antenna for a high frequency band and an antenna for a low frequency band to achieve multiband compatibility.

SUMMARY

A mobile terminal of an aspect of the present disclosure includes a first antenna, a first communication module, a second antenna, a second communication module, a memory module, and a processor. The first communication module is configured to carry out communication using the first antenna. The second communication module is configured to carry out communication using the second antenna. The memory module is configured to store a control program. The processor is configured to control the first communication module and the second communication module by executing the control program such that communication at a first frequency included in a first frequency band or a second frequency included in a second frequency band is carried out using the first communication module, and such that communication at a third frequency included in a third frequency band is carried out using the second communication module. The first communication module has an adjustment module. The adjustment module is configured to reduce interference between the first antenna and the second antenna when the communication at the third frequency is carried out.

The foregoing and other objects, features, aspects and advantages of the present disclosure will become more apparent from the following detailed description of the present disclosure when taken in conjunction with the accompanying drawings.

BRIEF DESCRIPTION OF THE DRAWINGS

FIG. 6 represents a schematic configuration of a communication module according to a first embodiment.

DETAILED DESCRIPTION

Figure 1:
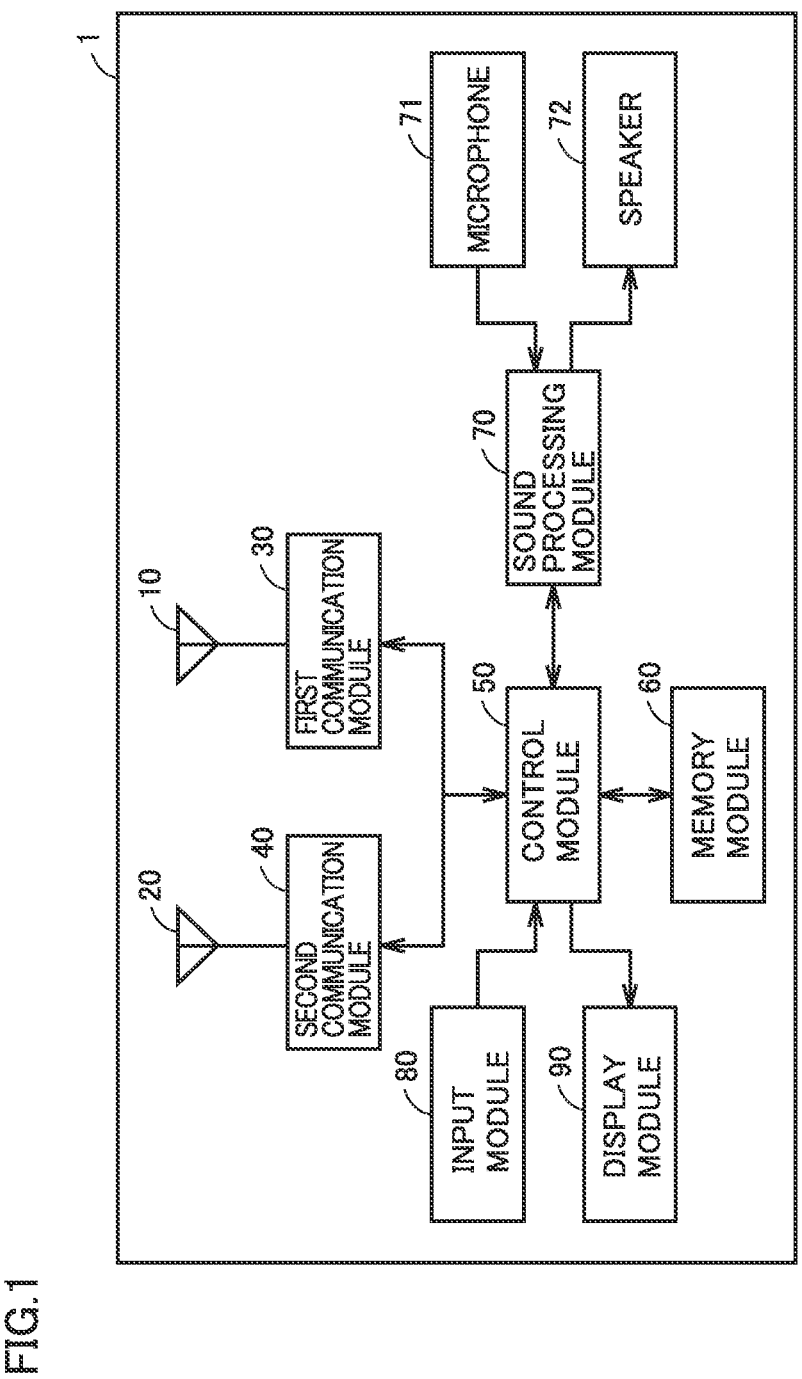
FIG. 1 represents a functional configuration of a mobile terminal according to an embodiment.

Hereinafter, embodiments of the present disclosure will be described with reference to the drawings. In the drawings, the same or corresponding portions have the same reference characters allotted, and description thereof will not be repeated.

In the following embodiments, a smartphone will be described as a mobile terminal by way of example. The mobile terminal is not limited to a smartphone, but may be, for example, a tablet PC, a portable music player or the like. Smartphones according to embodiments adopt CSFB (Circuit Switched FallBack) that carries out data communication via LTE (Long Term Evolution), and when making a voice call, switches the communication system to a circuit switching system such as 3G. Although CDMA (Code Division Multiple Access), UMTS (Universal Mobile Telecommunications System), GSM (Global System for Mobile communications, registered trademark) or the like can be adopted as the circuit switching system, the following embodiments will describe an example in the case of LTE.

In the mobile terminal according to an embodiment, CSFB is not indispensable. It may be a mobile terminal adopting VoLTE (Voice over LTE) or SVLTE (Simultaneous Voice and LTE), for example.

FIG. 1 represents a functional configuration of a smartphone 1 according to an embodiment. Smartphone 1 includes a first antenna 10, a second antenna 20, a first communication module 30, a second communication module 40, a control module 50, a memory module 60, a sound processing module 70, a microphone 71, a speaker 72, an input module 80, and a display module 90.

Control module 50 may be CPU (Central Processing Unit). Although not shown, control module 50 may include memory devices, such as SRAM (Static Random Access Memory) and DRAM (Dynamic Random Access Memory). Control module 50 can provide integrated control of operations of smartphone 1.

First communication module 30 to which first antenna 10 is connected and second communication module 40 to which second antenna 20 is connected can carry out communication with a wireless base station not shown in different frequency bands from each other based on instructions from control module 50.

First communication module 30 can modulate a signal received from control module 50 for transmission via first antenna 10. First communication module 30 can demodulate a signal received by first antenna 10 for transmission to control module 50.

The flow of signal processing in second communication module 40 is similar to that in first communication module 30.

Memory module 60 has stored therein programs of an OS (Operating System) and various applications read and executed by control module 50 as well as various types of data used by those programs. Memory module 60 has stored therein a control program executed by control module 50 for achieving communication through first communication module 30 and communication through second communication module 40. Memory module 60 includes memory devices such as, for example, nonvolatile semiconductor memories such as ROM (Read Only Memory), EEPROM (Electrically Erasable Programmable ROM) and a flash memory, as well as HDD (Hard Disk Drive).

Sound processing module 70 can process an audio signal input to microphone 71 for transmission to control module 50. Sound processing module 70 can output an audio signal to speaker 72 based on a signal received from control module 50.

Input module 80 can receive an input from a user, and can transmit a signal based on that input to control module 50. Input module 80 is implemented by a button or a touch panel, for example.

Display module 90 can provide a display based on a signal received from the control module. Display module 90 includes, for example, a liquid crystal display, a plasma display, an organic electroluminescence display, or the like.

Figure 2:
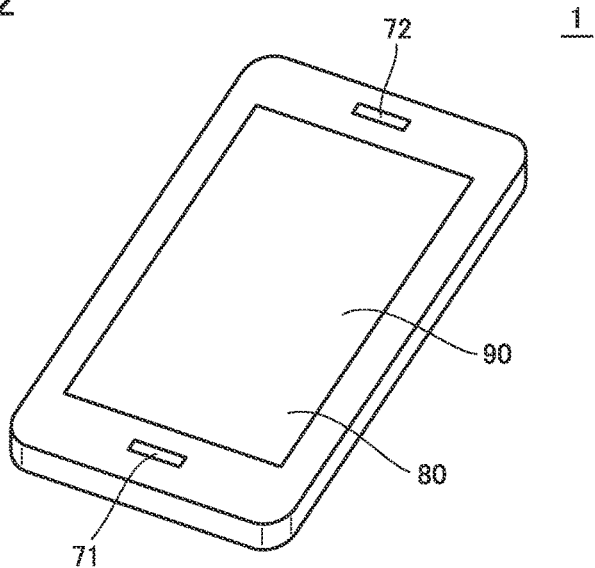
FIG. 2 is a perspective view representing an appearance of the mobile terminal according to an embodiment.

FIG. 2 is a perspective view representing an appearance of smartphone 1. Smartphone 1 includes speaker 72 at the longitudinally upper part of a main body, microphone 71 at the longitudinally lower part of the main body, as well as input module 80 and display module 90 at the central part.

Figure 3:
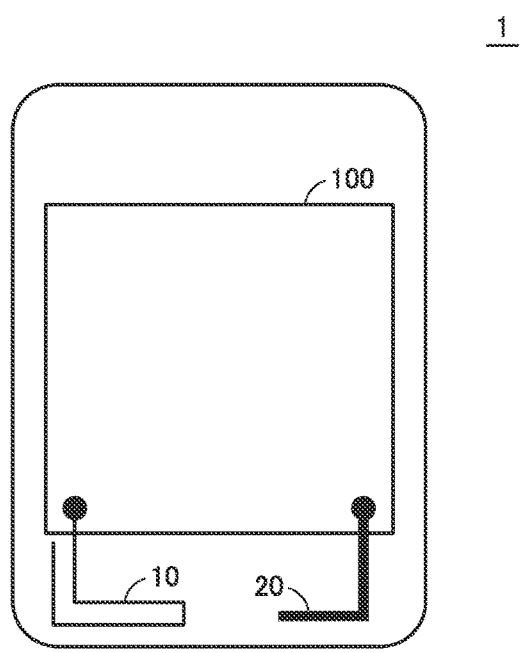
FIG. 3 represents an arrangement of antennas of the mobile terminal according to an embodiment.

FIG. 3 represents an arrangement of the antennas in the inside of smartphone 1. Smartphone 1 has an electronic substrate 100, first antenna 10, and second antenna 20. Electronic substrate 100 has mounted thereon elements of a circuit that implement first communication module 30, second communication module 40, control module 50, memory module 60, sound processing module 70, and the like shown in FIG. 1. Electronic substrate 100 is implemented by a single electronic substrate or a plurality of electronic substrates.

First antenna 10 has its one end connected to the electronic substrate. First antenna 10 is made thin so as to have a design suitable for communication in a low frequency band (700 to 900 MHz), and is arranged at the lower part of smartphone 1 in a folded manner.

Second antenna 20 is connected to the electronic substrate. Second antenna 20 is arranged at the lower part of smartphone 1 opposite to, and in proximity to, first antenna 10.

Smartphone 1 includes at its upper part a receive-only antenna (not shown) used for WiFi (Wireless Fidelity), GPS (Global Positioning System), and the like.

As a comparative example, suppose a case where communication can be carried out via first antenna 10 in the frequency bands of 700 MHz and 2500 MHz, while communication can be carried out via second antenna 20 in the frequency bands of 800 to 900 MHz and 1700 to 2100 MHz. First antenna 10 and second antenna 20 are each available for communication both in a low frequency band (700 to 900 MHz) and a high frequency band (1700 to 2500 MHz).

Figure 4A:
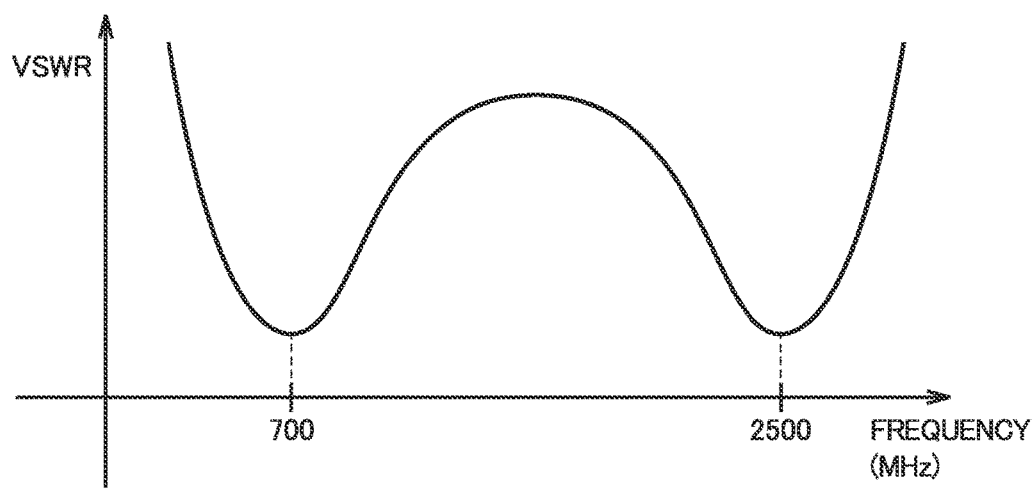
FIG. 4A represents frequency characteristics of a first antenna of a mobile terminal according to a comparative example.
Figure 4B:
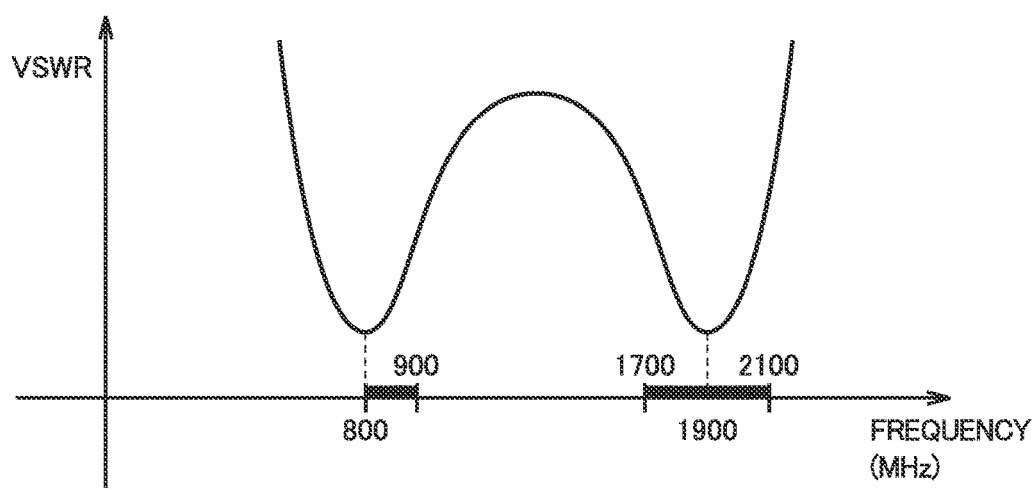
FIG. 4B represents frequency characteristics of a second antenna of the mobile terminal according to the comparative example.

FIG. 4A represents frequency characteristics of first antenna 10 of a mobile terminal according to the comparative example. FIG. 4B represents frequency characteristics of second antenna 20 of the mobile terminal according to the comparative example. In FIGS. 4A and 4B, the horizontal axis indicates frequency (MHz), and the vertical axis indicates VSWR (Voltage Standing Wave Ratio). Generally, antennas have higher performance as VSWR is lower. As seen from FIGS. 4A and 4B, first antenna 10 is adapted to exhibit high performance in the 700 MHz band and the 2500 MHz band, and second antenna 20 is adapted to exhibit high performance in the 800 to 900 MHz band and the 1700 to 2100 MHz band.

When arranged in proximity to each other, two antennas having low VSWR in close frequency bands may interfere with each other. Since the 700 MHz band and the 800 to 900 MHz band are close to each other, and the high frequency 2500 MHz band and the 1700 to 2100 MHz band are close to each other, first antenna 10 and second antenna 20, if arranged in proximity to each other, may interfere with each other in communication both in the low and high frequency bands, and may deteriorate in performance.

As a solution to such a problem, it is conceivable to arrange one of the antennas at the upper part of the mobile terminal where a speaker and the like are arranged and the other antenna at the lower part of the mobile terminal where a microphone and the like are arranged, respectively. Since such an arrangement can ensure a sufficient distance between the antennas, interference between the antennas is reduced. A user often brings his/her head close to the upper part of the mobile terminal where the speaker and the like are arranged in order to listen to sound from the speaker.

Since the upper part of the mobile terminal is brought close to the user's head, it is preferable to arrange first antenna 10 and second antenna 20, which output high-energy electromagnetic waves, at the lower part of the mobile terminal away from the user's head. When first antenna 10 and second antenna 20 are both arranged at a part of the smartphone, the antennas may be in proximity to each other.

The following will describe an embodiment in which even if first antenna 10 and second antenna 20 are in proximity to each other, interference therebetween can be reduced and performance degradation of the antennas can be avoided.

First Embodiment

In a first embodiment, initially, first antenna 10 is designed to be communicable in a low frequency band, and second antenna 20 is designed to be communicable in a high frequency band. In the following embodiment, the frequency bands in which communication can be carried out via first antenna 10 shall be the 700 MHz band and the 800 to 900 MHz band, and the frequency bands in which communication can be carried out via second antenna 20 shall be the 1700 to 2500 MHz band.

Figure 5:
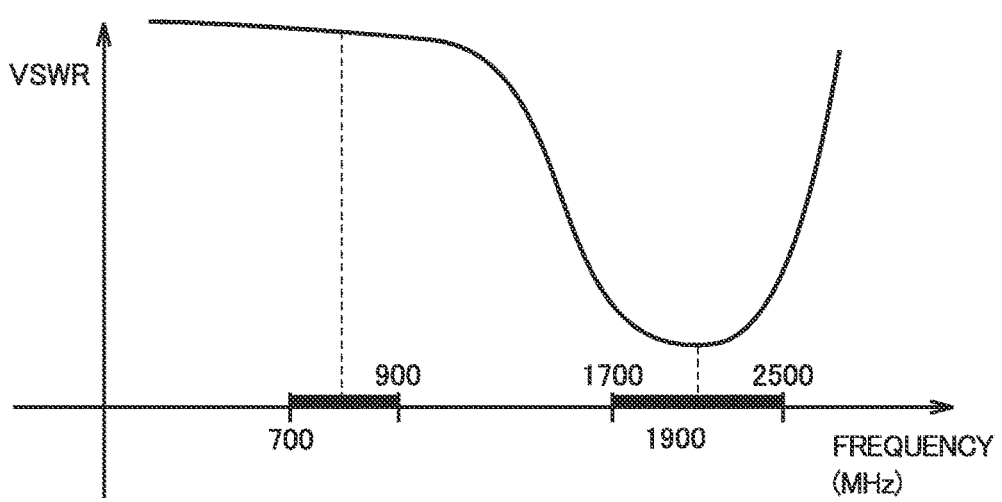
FIG. 5 represents frequency characteristics of a second antenna of the mobile terminal according to an embodiment.

FIG. 5 represents frequency characteristics of second antenna 20 according to the first embodiment. Second antenna 20 has low VSWR in the 1700 to 2500 MHz band, and high VSWR in the 700 to 900 MHz band. In the first embodiment, interference between the antennas in a low frequency band can be reduced, and performance degradation of the antennas can be avoided.

A configuration for reducing interference between the antennas in a high frequency band will be described below.

FIG. 6 represents a schematic configuration of first communication module 30 and second communication module 40 in the first embodiment. Control module 50 achieves communication through first communication module 30 and communication through second communication module 40 which will be described below by executing the control program stored in memory module 60.

First communication module 30 includes an antenna switch 301 for carrying out communication in the 700 MHz band and communication in the 800 to 900 MHz band, duplexers 302, 303, power amplifiers 304, 305, low noise amplifiers 306, 307, band pass filters 308, 309, a signal processing module 310, and an impedance characteristic switch 320.

First communication module 30 can use antenna switch 301, duplexer 302, power amplifier 304, low noise amplifier 306, band pass filter 308, and signal processing module 310 for communication in the 700 MHz band.

First communication module 30 can use antenna switch 301, duplexer 303, power amplifier 305, low noise amplifier 307, band pass filter 309, and signal processing module 310 for communication in the 800 to 900 MHz band.

Antenna switch 301 can switch connection between first antenna 10 and duplexer 302 or duplexer 303 depending on the frequency band in which communication is carried out. Specifically, antenna switch 301 can connect first antenna 10 and duplexer 302 at the time of communication in the 700 MHz band, and can connect first antenna 10 and duplexer 303 at the time of communication in the 800 to 900 MHz band.

Duplexer 302 can separate a transmission signal and a received signal in the 700 MHz band. Duplexer 303 can separate a transmission signal and a received signal in the 800 to 900 MHz band.

At the time of transmission in the 700 MHz band, a transmission signal from control module 50 is modulated by signal processing module 310, then amplified by power amplifier 304, passed through duplexer 302, and transmitted via first antenna 10.

At the time of reception in the 700 MHz band, a received signal via first antenna 10 is passed through duplexer 302, and then amplified by low noise amplifier 306. After signals other than those in the 700 MHz band (unnecessary waves) are removed by band pass filter 308, a received signal via first antenna 10 is demodulated by signal processing module 310 and transmitted to control module 50.

Communication in the 800 MHz band is carried out by duplexer 303, power amplifier 305, low noise amplifier 307, band pass filter 309, and signal processing module 310. Their roles and the process flow are similar to those in the case of communication in the 700 MHz band, and therefore detailed description about communication in the 800 to 900 MHz band will not be repeated.

Second communication module 40 includes an antenna switch 401, duplexers 402, 403, power amplifiers 404, 405, low noise amplifiers 406, 407, band pass filters 408, 409, and signal processing module 410, and can carry out communication in the 1900 MHz band and the 2500 MHz band using second antenna 20.

Second communication module 40 can use antenna switch 401, duplexer 402, power amplifier 404, low noise amplifier 406, band pass filter 408, and signal processing module 410 for communication in the 1900 MHz band.

Second communication module 40 can use antenna switch 401, duplexer 403, power amplifier 405, low noise amplifier 407, band pass filter 409, and signal processing module 410 for communication in the 2500 MHz band.

Impedance characteristic switch 320 includes a switch 321 and capacitors 322, 323. Switch 321 has its one terminal connected to first antenna 10, and the other terminal can be connected to capacitor 322 or capacitor 323. Capacitor 322 has its one terminal connected to switch 321, and the other terminal grounded. Capacitor 323 has its one terminal connected to switch 321, and the other terminal grounded. Capacitor 322 is adapted to lower VSWR of first antenna 10 in the 700 MHz band by being connected to first antenna 10. Capacitor 323 is adapted to lower VSWR of first antenna 10 in the 800 to 900 MHz band by being connected to first antenna 10. For example, capacitor 322 has a capacitance of 3.0 pF, and capacitor 323 has a capacitance of 4.0 pF. Either capacitor 322 or capacitor 323 may have a capacitance of 0.

Based on an instruction from control module 50, impedance characteristic switch 320 can cause switch 321 to switch the connection between first antenna 10 and capacitor 322 or capacitor 323 to vary the impedance characteristics of first antenna 10. As a result, the resonance frequency of first antenna 10 varies, so that VSWR of the first antenna can be varied.

Figure 7A:
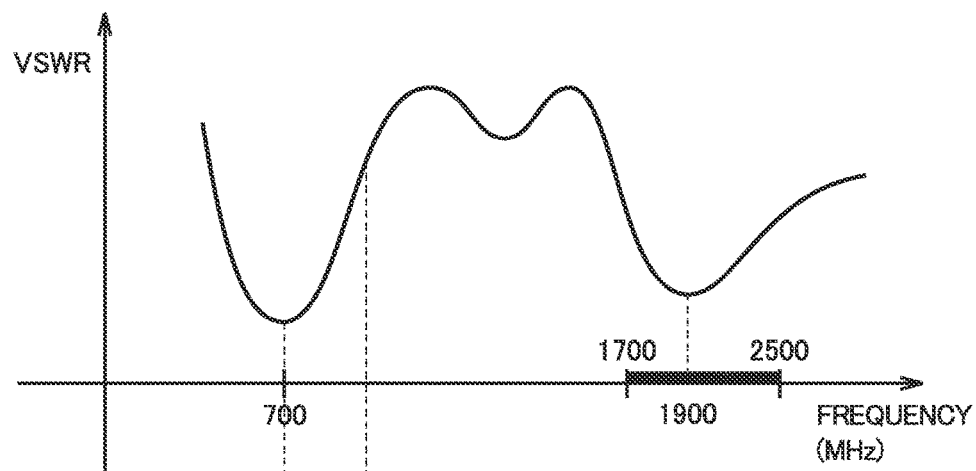
FIG. 7A represents frequency characteristics of a first antenna connected to a first capacitor according to the first embodiment.
Figure 7B:
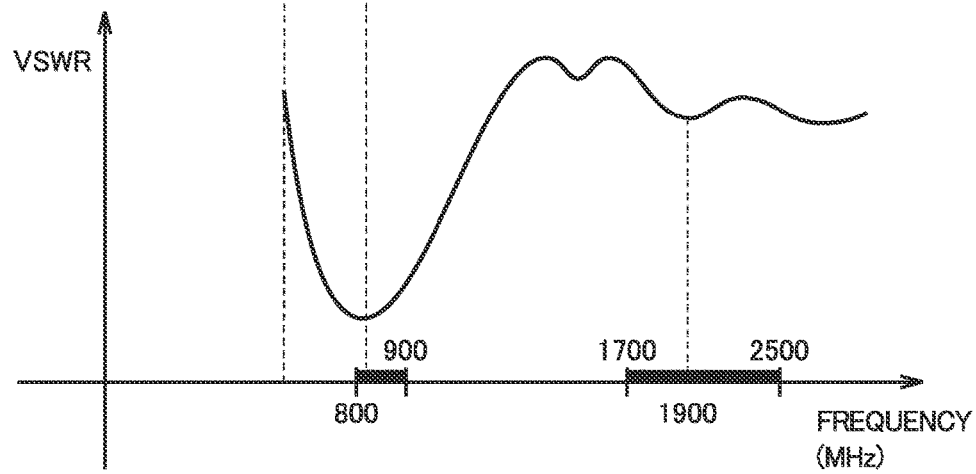
FIG. 7B represents frequency characteristics of the first antenna connected to a second capacitor according to the first embodiment.

FIGS. 7A and 7B show frequency characteristics of first antenna 10 according to the present embodiment. FIG. 7A shows frequency characteristics when first antenna 10 is connected to capacitor 322, and FIG. 7B shows frequency characteristics when first antenna 10 is connected to capacitor 323.

In the 700 MHz band, VSWR is lower in the case shown in FIG. 7A, while in the 800 to 900 MHz band, VSWR is lower in the case shown in FIG. 7B.

Paying attention to the 1700 to 2500 MHz band, first antenna 10 has higher VSWR in the case shown in FIG. 7B. In the 1700 to 2500 MHz band, since the performance of first antenna 10 can be made lower in the case shown in FIG. 7B, interference between first antenna 10 and second antenna 20 can be reduced more than in the case shown in FIG. 7A.

In the first embodiment, impedance characteristic switch 320 can connect first antenna 10 to capacitor 322 based on an instruction from control module 50 at the time of communication in the 700 MHz band. At the time of communication in the 800 to 900 MHz band, impedance characteristic switch 320 can connect first antenna 10 to capacitor 323 based on an instruction from control module 50. At the time of communication in the 1700 to 2500 MHz band, impedance characteristic switch 320 can connect first antenna 10 to capacitor 323 based on an instruction from control module 50.

By thus controlling impedance characteristic switch 320 by control module 50, interference between first antenna 10 and second antenna 20 can be reduced, and performance degradation of each antenna can be avoided in communication in the frequency bands of 700 to 900 MHz and 1700 to 2500 MHz even if first antenna 10 and second antenna 20 are arranged in proximity to each other.

Variation of First Embodiment

Figure 8:
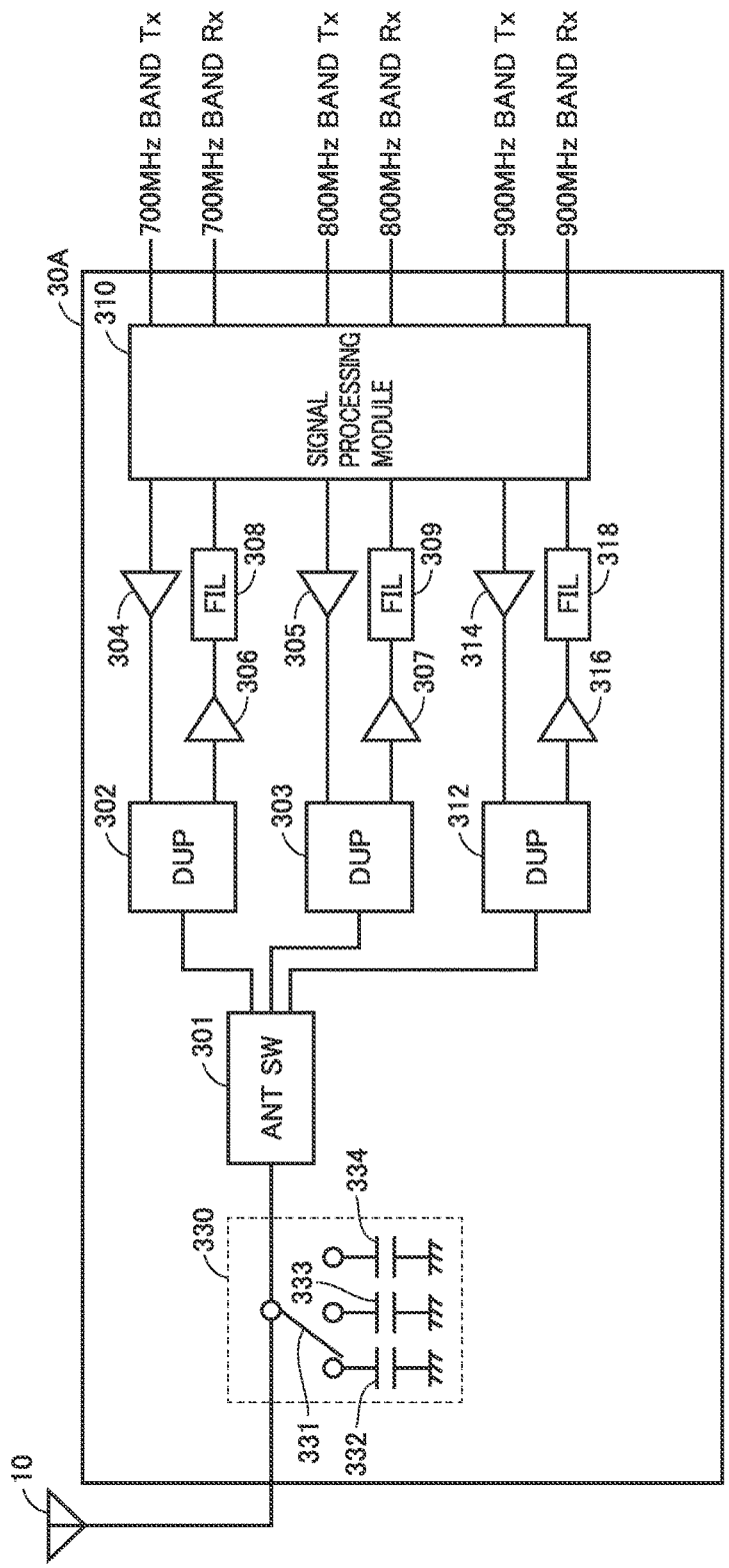
FIG. 8 represents a schematic configuration of a communication module according to a variation of the first embodiment.

FIG. 8 represents a schematic configuration of a first communication module 30A according to a variation of the first embodiment.

In the variation of the first embodiment, first communication module 30A carries out communication in three frequency bands of 700 MHz, 800 MHz and 900 MHz. Circuit elements and the process flow in communication in each frequency band are similar to those in the first embodiment, and therefore, description thereof will not be repeated. Since second communication module 40 is similar to that of the first embodiment, it is not shown in FIG. 8.

An impedance characteristic switch 330 includes a switch 331 and capacitors 332, 333 and 334. Capacitor 332 is adapted to lower VSWR of first antenna 10 in the 700 MHz band by being connected to first antenna 10. Capacitor 333 is adapted to lower VSWR of first antenna 10 in the 800 MHz band by being connected to first antenna 10. Capacitor 334 is adapted to lower VSWR of first antenna 10 in the 900 MHz band by being connected to first antenna 10. Based on an instruction from control module 50, impedance characteristic switch 330 can cause switch 331 to switch the connection between first antenna 10 and capacitor 332, 333 or 334 to switch the impedance characteristics of first antenna 10. Specifically, impedance characteristic switch 330 can connect first antenna 10 and capacitor 332 in communication in the 700 MHz band, can connect first antenna 10 and capacitor 333 in communication in the 800 MHz band, and can connect first antenna 10 and capacitor 334 in communication in the 900 MHz band.

With such a configuration, in the case of communication in the three low frequency bands, impedance characteristic switch 330 can also provide first antenna 10 with impedance characteristics in which VSWR in each frequency band is made lower by switching the impedance characteristics of first antenna 10 depending on the frequency band for communication carried out by first communication module 30A.

Impedance characteristic switch 330 can provide first antenna 10 with impedance characteristics that result in frequency characteristics in which interference between first antenna 10 and second antenna 20 is minimized when communication in the 1700 to 2500 MHz band is carried out by second communication module 40.

The number of capacitors switched by impedance characteristic switch 330 may be four or more. Electronic devices whose connection to first antenna 10 is switched by switch 331 are not limited to capacitors. The electronic devices only need to be capable of changing the impedance characteristics of first antenna 10, and may be inductors, for example.

Second Embodiment

The first embodiment has described the configuration in which the impedance characteristics of first antenna 10 are switched by impedance characteristic switch 320 to reduce interference between the antennas in a high frequency band. The second embodiment will describe a configuration for reducing interference between the antennas in a high frequency band using a high-frequency impedance matching element 340 that eliminates the necessity to switch impedance characteristics of first antenna 10.

Figure 9:
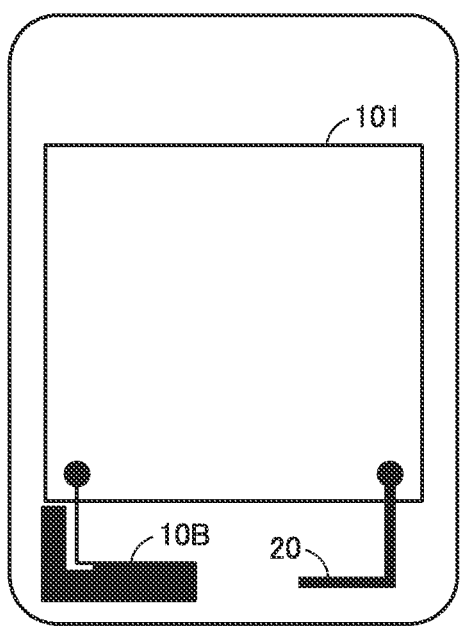
FIG. 9 represents an arrangement of antennas of a mobile terminal according to a second embodiment.

FIG. 9 represents an arrangement of a first antenna 10B and second antenna 20 in a smartphone 1B according to the second embodiment.

Although first antenna 10B and second antenna 20 are connected to an electronic substrate 101 similarly to the first embodiment and are arranged in proximity to each other at the lower part of smartphone 1, first antenna 10B is thicker and shorter than first antenna 10 of the first embodiment. With such a design, first antenna 10B can be provided with a capacitance (C component), and taking full advantage of the impedance transformer ratio of high-frequency impedance matching element 340 which will be described later, the characteristic impedance of first antenna 10B can be brought closer to 500 in a low frequency band in a broader bandwidth than in a conventional antenna.

Figure 10:
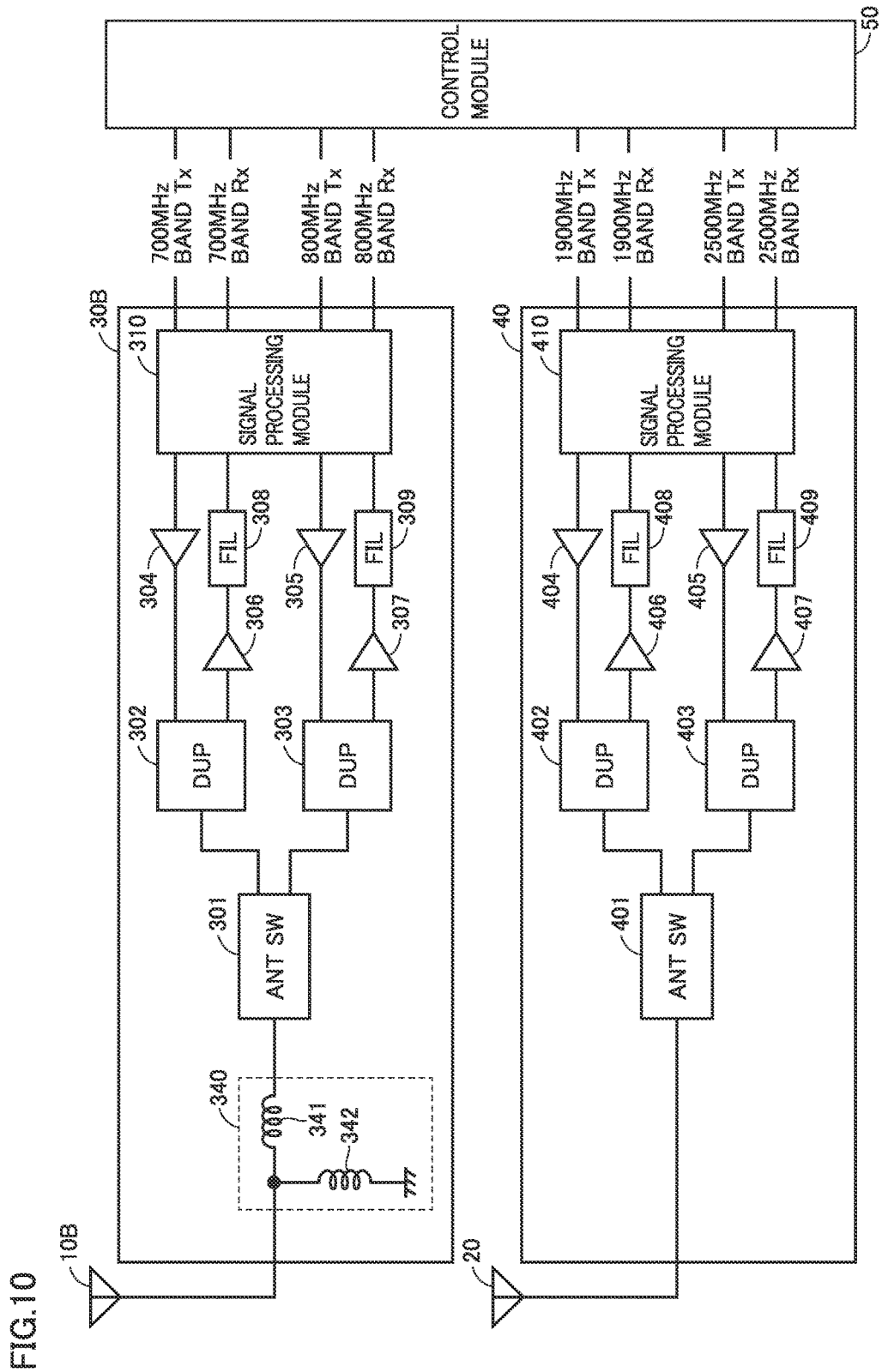
FIG. 10 represents a schematic configuration of a communication module according to the second embodiment.

FIG. 10 represents a schematic configuration of a first communication module 30B according to the second embodiment. Referring to FIG. 10, first communication module 30B differs from first communication module 30 of the first embodiment in that high-frequency impedance matching element 340 is provided between first antenna 10B and antenna switch 301. The remaining configuration is similar to the first embodiment, and therefore, description thereof will not be repeated.

High-frequency impedance matching element 340 includes inductors 341 and 342. Inductor 341 has its one terminal connected to first antenna 10B. Inductor 341 has the other terminal connected to antenna switch 301. Inductor 342 has its one terminal connected to first antenna 10B. Inductor 342 has the other terminal grounded. With such a configuration, high-frequency impedance matching element 340 will have transformer characteristics (transformation function), can set impedance matching both in the 700 to 900 MHz band and in the 1700 to 2500 MHz band, and can provide first antenna 10B with such frequency characteristics that VSWR is made lower in a low frequency band and VSWR is made higher in a high frequency band. As high-frequency impedance matching element 340, a high frequency matching transformer (SMST21NMHB series) or the like can be adopted.

Figure 11:
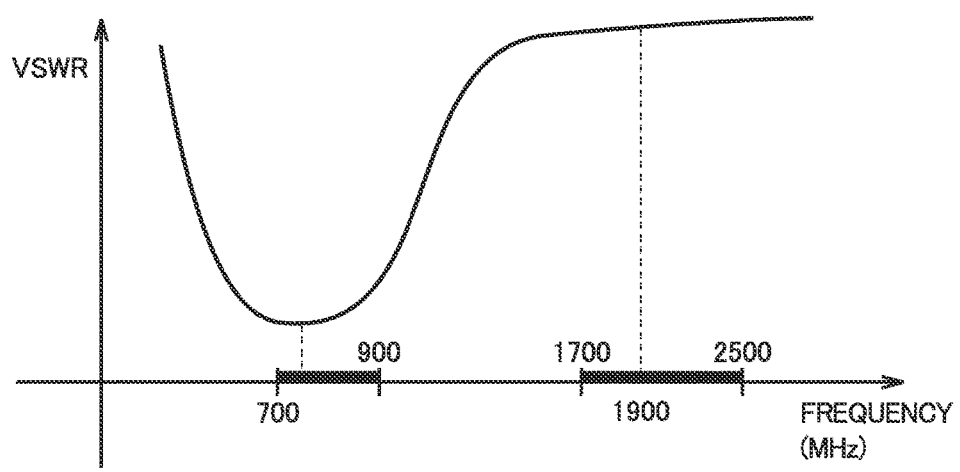
FIG. 11 represents frequency characteristic of a first antenna according to the second embodiment.

FIG. 11 represents frequency characteristics of first antenna 10B according to the second embodiment. First antenna 10B has VSWR of low values throughout the 700 to 900 MHz band, and has VSWR of high values in the 1700 to 2500 MHz band.

With such a configuration, in communication in the frequency bands of 700 to 900 MHz and 1700 to 2500 MHz, interference between first antenna 10B and second antenna 20 can be reduced, and performance degradation of each antenna can be avoided, even if first antenna 10B and second antenna 20 are arranged in proximity to each other.

Figure 12:
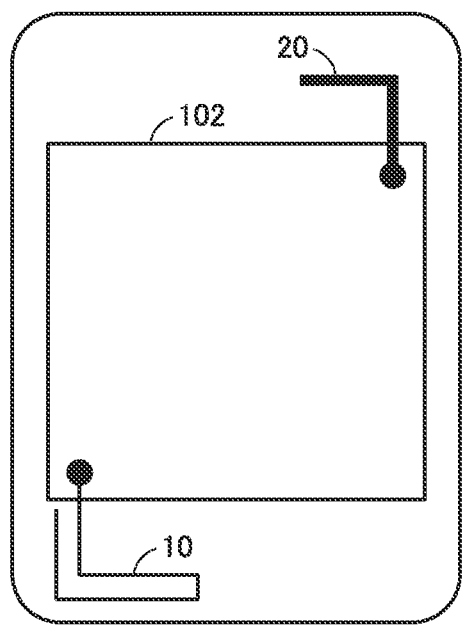
FIG. 12 represents a variation for an arrangement of antennas.

The present disclosure is not limited to the above-described embodiments, but also includes a variation as shown in FIG. 12. Referring to FIG. 12, in the variation, first antenna 10 is connected to an electronic substrate 102 and arranged at the lower part of smartphone 1. Second antenna 20 is connected to electronic substrate 102 at a position diagonally upward from the position on electronic substrate 102 to which first antenna 10 is connected, and arranged at the upper part of smartphone 1. In such a case, the present disclosure may also be applied.

Although the present disclosure has been described and illustrated in detail, it is clearly understood that the same is by way of illustration and example only and is not to be taken by way of limitation, the scope of the present disclosure being interpreted by the terms of the appended claims.

The invention claimed is:

1. A mobile terminal comprising:
   a first antenna;
   a first communication module configured to carry out communication using the first antenna;
   a second antenna;
   a second communication module configured to carry out communication using the second antenna;
   a memory module configured to store a control program; and
   a processor configured to control the first communication module and the second communication module by executing the control program, such that communication at one of a first frequency included in a first frequency band and a second frequency included in a second frequency band is carried out using the first communication module, and such that communication at a third frequency included in a third frequency band is carried out using the second communication module, wherein the first communication module comprises a switch configured to connect the first antenna to one of a first device and a second device, wherein, when the switch connects the first antenna to the first device, the first antenna has a first characteristic, and, when the switch connects the first antenna to the second device, the first antenna has a second characteristic that is different than the first characteristic, and wherein the processor, when the communication at the third frequency is carried out, controls the switch to connect the first antenna to the second device such that the first antenna has the second characteristic.

2. The mobile terminal according to claim 1, wherein a standing-wave ratio of the second antenna at the third frequency is smaller than the standing-wave ratio of the first antenna at the third frequency.

3. The mobile terminal according to claim 2, wherein the standing-wave ratio of the first antenna at the third frequency is larger when the first antenna has the second characteristic than when the first antenna has the first characteristic.

4. The mobile terminal according to claim 3, wherein the first characteristic and the second characteristic both comprise an impedance characteristic.

5. The mobile terminal according to claim 4, wherein the first device comprises a first capacitor and the second device comprises a second capacitor.

6. The mobile terminal according to claim 3, wherein
the standing-wave ratio of the first antenna at the first frequency is larger in the case of the second characteristic than in the case of the first characteristic,
the standing-wave ratio of the first antenna at the second frequency is larger in the case of the first characteristic than in the case of the second characteristic, and
the processor is configured to control the switch so as to connect the first antenna to the first device when the communication at the first frequency is carried out, and connect the first antenna to the second device when the communication at the second frequency is carried out.

7. The mobile terminal according to claim 1, wherein the first frequency band includes 700 MHz, the second frequency band includes 800 to 900 MHz, and the third frequency band includes 1500 to 2500 MHz.

8. The mobile terminal according to claim 7, wherein the first device comprises a first capacitor and the second device comprises a second capacitor.

* * * * *